June 14, 1966  E. HITZELBERGER  3,255,685
VENTILATION INSTALLATION FOR AUTOMOBILES
Filed Nov. 16, 1962  4 Sheets-Sheet 1

INVENTOR.
ERWIN HITZELBERGER
BY Dicke & Craig
ATTORNEYS

June 14, 1966  E. HITZELBERGER  3,255,685
VENTILATION INSTALLATION FOR AUTOMOBILES
Filed Nov. 16, 1962  4 Sheets-Sheet 2
FIG. 7
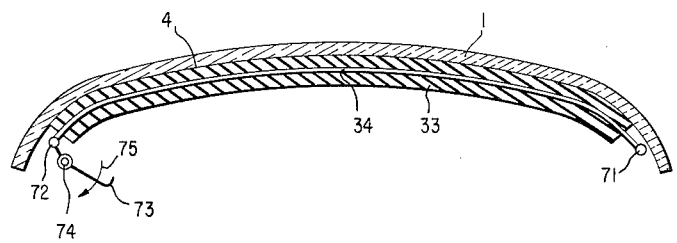
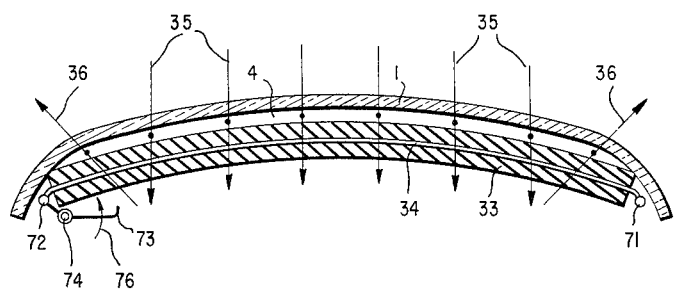
FIG. 8
INVENTOR.
ERWIN HITZELBERGER
BY Dicke & Craig
ATTORNEYS June 14, 1966   E. HITZELBERGER   3,255,685
VENTILATION INSTALLATION FOR AUTOMOBILES
Filed Nov. 16, 1962   4 Sheets-Sheet 3
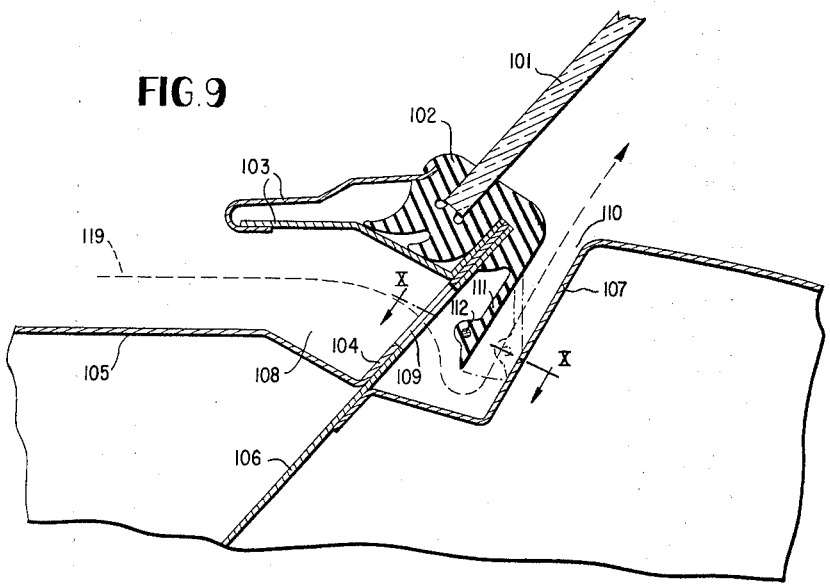
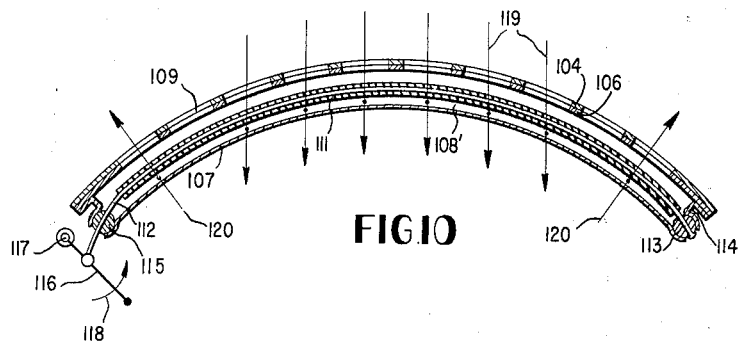
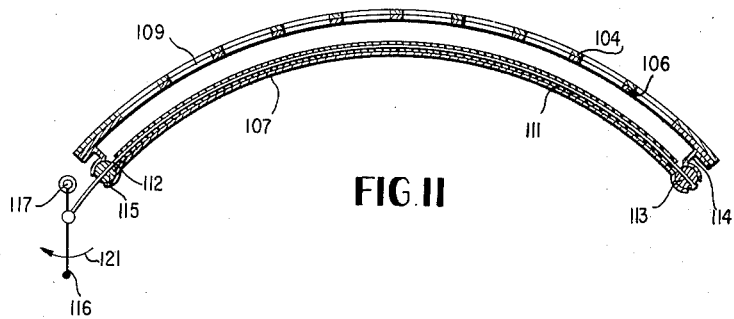
INVENTOR.
ERWIN HITZELBERGER
BY Dicke & Craig
ATTORNEYS INVENTOR.
ERWIN HITZELBERGER
BY Dicke & Craig
ATTORNEYS

United States Patent Office 3,255,685
Patented June 14, 1966

3,255,685
VENTILATION INSTALLATION FOR AUTOMOBILES
Erwin Hitzelberger, Stuttgart-Rohr, Germany, assignor to Daimler-Benz Aktiengesellschaft, Stuttgart-Unterturkheim, Germany
Filed Nov. 16, 1962, Ser. No. 238,241
Claims priority, application Germany, Nov. 18, 1961, D 37,490, D 37,492
12 Claims. (Cl. 98—2)

The present invention relates to an installation for ventilating, that is, supplying fresh air to and/or removing stale air from the internal space of motor vehicles provided with rigidly retained or supported window panes in which the air passage, that is, the inflow and outflow, takes place within the area of the rims of the window panes.

Additionally, the present invention relates to an installation for ventilating, that is, supplying to or removing air from the interior space of motor vehicles and/or for heating the interior space of motor vehicles, in which the air passage takes place through a relatively flat and wide channel which discharges preferably within the area of the circumference of a transparent pane and which extends within the area directly in front of the discharge approximately parallelly to this transparent window pane.

It is known in the prior art to provide, within the area of the rims of the window panes of a motor vehicle, especially within the area of the lower edge of the windshield, ventilating slots within the outer body cover panels of the motor vehicle which are in communication with air ducts or channels which, in turn, discharge or terminate in the interior space of the motor vehicle. The accommodation of such apertures in the vehicle outer body cover panels of the vehicle as well as the air ducts or channels is complicated and expensive. Additionally, throttle valves, slide members or the like have to be provided thereat in order to enable a control of the air quantity passing therethrough. As a result thereof, the outlays and costs of the known prior art installations for ventilating the interior space of motor vehicles are additionally increased.

Furthermore, there is known in the prior art a ventilating installation for vehicles in which a pane consisting of transparent synthetic material is retained in an elastic mounting or frame at the vehicle body. The elastic mounting has an essentially Z-shaped cross-sectional configuration and is constructed yieldingly in the manner of a folding bellows transversely to the plane of the pane. The center web portion of the Z-shaped pane mounting or support is provided with apertures for the ventilation of the vehicle interior space which may be opened by the outward displacement of the pane and the elongation of the folds conditioned thereby. With such types of installations, there exists the danger that the pane, because of vibrations and shocks during driving operation, becomes disengaged from the mounting or support thereof. Consequently, the aperture for the ventilation should be provided with the known installation only over a relatively short section of the window pane rim. This gap is to open thereby essentially as a result of the relatively large heat expansion and the deformation of the synthetic material pane conditioned thereby. For normal glass windows, however, this known prior art installation is hardly worthy of consideration because of the considerable lack of safety which is given by the danger of a disengagement of the window pane.

The present invention aims at avoiding the disadvantages of such known prior art installation and to create a particularly simple and inexpensive installation for the ventilation of the internal space of passenger motor vehicles having rigidly retained window panes which is nevertheless very effective.

The present invention essentially consists in movably arranging at one or several window panes the means for sealing the same with respect to the adjoining body parts at least over a part of the length thereof and by enabling lifting these means from the pane or the edges thereof so that these means selectively release or open up a gap between the free edge of the window pane and the seal or the adjoining body parts for the supply and/or removal of air.

According to a further feature in accordance with the present invention, the pane may be sealed by an elastic profiled ledge member or sectional strip which is tightened from the outside by a wire or a cable system inserted therein against the gap between the window pane and the adjoining body parts and which has, for example, a circular cross section. In lieu thereof, the profiled ledge member or sectional strip may also have a V-shaped cross section and may be pulled into the gap with the apex thereof.

According to still a further feature of the present invention, the panes may also be sealed by an elastic sealing ledge member or strip secured to the adjoining body part which is pressed from the inside thereof against the window pane within the area of the circumference thereof. The sealing ledge member or strip may thereby abut with a lip portion at the pane, which lip portion is adapted to be lifted from and/or pressed against the window pane by means of a wire or cable inserted into the lip portion. The sealing ledge member or strip, instead may also be constructed of essentially U-shaped cross section and may abut against the sealing pane within the area of the arcuate portion thereof, whereas one leg portion is secured at the window frame and the other, possibly angularly bent leg portion, is formed by a thrust member by means of which the seal is adapted to be lifted from the pane and/or is adapted to be pressed thereagainst.

According to still a further feature of the present invention, the transparent or clear vision pane may also be sealed by a sealing ledge member or strip in the form of an elastic hose which is adapted to be pressed against the pane by the admission of a pressure medium and/or is adapted to be lifted from the pane by the creation of a vacuum therewithin. It is thereby particularly appropriate if the form of the hose is adapted to be changed in the direction of a windowpane surface and the hose comes into abutment against the edge of the pane.

The sealing ledge members or strips may advantageously be provided with a groove by means of which they are emplaced on a web portion at the adjoining vehicle body part, especially at the window frame. Instead, the sealing strips or ledge members may also be provided with a web portion which is secured at the surface of the adjoining vehicle body part or may possess a dovetail-shaped sectional base body which is inserted into a corresponding channel or groove at the adjoining body part of the window frame and is retained therein, for example, by means of clamps or resilient means.

The sealing ledge members or strips are appropriately so constructed that in the relieved condition they abut elastically against the windowpane so that in case of breakdown or malfunction of the actuating mechanism, the gap at the free edge of the window pane is closed. In order to avoid the penetration of rain or dust into this gap, sheet metal elements or the like are arranged appropriately in front or to the rear of the free edge of the transparent pane which effectuate a deflection of the air stream by more than 90° and therewith bring about a separation of the dust and water particles taken along.

For purposes of controlling the air passage, it is also known with prior art air conditioning installations for motor vehicles to provide within the air guiding channels or at the discharge apertures thereof, throttle valves or slide members by means of which the effective cross section of the air duct or channels or the discharge apertures may be changed or, if so desired, may also be completely closed. The construction and arrangement of such throttle valves or slide members as well as the actuating elements thereof does not involve any particular difficulties as long as the cross sections to be controlled are not excessively wide and have rectilinear contours. With very flat and wide channels and with cross sections having curved contours as are present, for example, along the lower edge of a panoramic windshield, the known prior art installations are applicable, if at all, only with great expenditures and under great difficulties.

The present invention also aims at eliminating the aforementioned disadvantages of such prior art installation, and essentially consists in arranging within the area of the discharge, along one wide side of the channel or duct, a profiled ledge member or sectional strip made of flexible material, such as rubber or synthetic material, having a lip portion projecting into the channel or duct which lip portion is adapted, for purposes of closing of the duct or channel, to be brought into abutment against the oppositely disposed wall of the channel or duct, and which is adapted, for purposes of opening the channel or duct, to be lifted from this wall. Such a profiled ledge member or sectional strip provided with a lip portion arranged thereat is highly suitable for closing flat and wide channels or ducts and may follow, without difficulties, any desired curvatures of the channel or aperture cross section.

For purposes of actuating the lip portion extending into the channel, there is again inserted, in a particularly advantageous manner, into the rim of the lip portion a wire or cable system which is adapted to be lengthened or shortened by any known adjusting mechanism. If the channel terminates or discharges within the area of the periphery of a transparent windowpane, then the lip portion may be arranged directly at the seal of the adjoining windowpane and may be made preferably in one piece with the same. This applies independently of whether the discharge of the channel or duct extends along a part or over the entire circumference of the transparent or clear-vision pane. In particular, the discharge aperture of the channel may be arranged within the area of the lower edge of the windshield pane and may extend over the entire width thereof.

According to still a further feature of the present invention, the channel may be directly in communication with air inlet apertures arranged preferably within the area of the clear-vision or transparent windowpane edges and outside on the vehicle. In this case, the channel is appropriately so constructed that a deflection of the air stream by at least 90° takes place in order to assure a good separation of dust and water particles taken along.

Accordingly, it is an object of the present invention to provide a ventilation system for supplying air to or removing air from the interior space of a motor vehicle as well as for heating the same which obviates, by simple means, the shortcomings and inadequacies of the prior art constructions.

Another object of the present invention resides in the provision of a ventilating system for motor vehicles having securely mounted windowpanes which is simple in construction, relatively inexpensive and does not entail costly controls.

It is another object of the present invention to provide a selectively actuatable ventilation system for motor vehicles effectively producing a ventilating gap along an edge portion of a windowpane which is relatively inexpensive in manufacture and assembly, relatively uncomplicated and highly reliable in operation and which does not entail large expenditures for in motor vehicles.

Another object of the present invention resides in the provision of a ventilating installation for motor vehicles providing a selectively actuatable ventilating gap along one or several rim portions of windows in motor vehicles which may be used with windowpanes that are normally retained rigidly in place within the vehicle and which does not entail the risk of loosening or disengaging the windowpane from the support or mounting thereof.

Still a further object of the present invention resides in the provision of a ventilating system for the supply of air to and removal of air from the interior space of a motor vehicle which effectively separates the water and dust particles from the air admitted to the vehicle interior space upon opening of the ventilating installation.

Still a further object of the present invention resides in the provision of a ventilating system, and more particularly of a control system for a ventilation system for vehicles which is adapted to control, in a completely satisfactory and reliable manner, relatively flat and wide air ducts extending near at least one edge of a windowpane.

Still another object of the present invention resides in the provision of a ventilating system which may be readily used with channels of any suitable contour, particularly of non-rectilinear contour in the channel and/or discharge aperture cross section thereof.

A further object of the present invention resides in the provision of a ventilating system for motor vehicles which is so constructed and arranged as to effectively separate dust and water particles from the air admitted to the vehicle interior space.

These and other objects, features and advantages of the present invention will become more obvious from the following description when taken in connection with the accompanying drawing which shows, for purposes of illustration only, several embodiments in accordance with the present invention, and wherein FIGURES 1 through 6 are schematic partial cross sectional views of six different embodiments of ventilating systems in accordance with the present invention;

FIGURE 7 is a cross sectional view of the actuating mechanism used with the embodiment of FIGURE 3, taken along line VII—VII of FIGURE 3 and showing the ventilating system in the closed condition;

FIGURE 8 is a cross sectional view, similar to FIGURE 7, and showing the ventilating system thereof in the open position;

FIGURE 9 is a partial cross sectional view through another embodiment of a ventilating system in accordance with the present invention;

FIGURE 10 is a schematic cross sectional view, on a smaller scale, taken along line X—X of FIGURE 9 and showing the arrangement with an open channel discharge;

FIGURE 11 is a schematic cross sectional view, similar to FIGURE 10, and illustrating the closed channel discharge;

Figure 1:
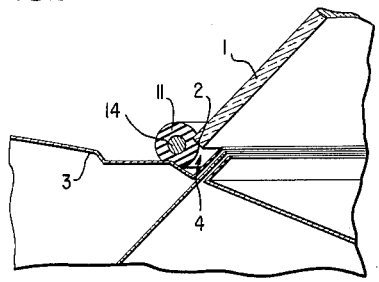

Referring now to the drawing wherein like reference numerals are used throughout the various views to designate like parts, the different views of FIGURES 1–6 show schematically a partial cross section of the front part of a motor vehicle of which the windsheld 1 is sealed at least within the area of the lower edge 2 thereof with respect to the adjoining body parts 3 by means which are adapted to be lifted from and/or adapted to be pressed against the pane 1 or the lower edge 2 thereof so that these means selectively open up a gap between the free edge 2 of the windshield 1 and the seal or the adjoining vehicle body part 3 for the supply and/or removal of air. The pane 1 may be retained at the vehicle part surrounding the same for this purpose, for example, by means of clamps or the like.

Referring now more particularly to FIGURE 1, an elastic profiled ledge member or sectional strip 11 having a circular cross section is provided for purposes of sealing the windshield pane 1 with respect to the outer vehicle body panel 3 which ledge member 11 extends below the lower edge 2 of the windshield 1. The profiled ledge member or sectional strip 11 is pulled from the outside by means of an inserted cable or wire 14 toward the gap 4 between the lower edge 2 of the window pane 1 and the adjoining body parts 3.

Figure 2:
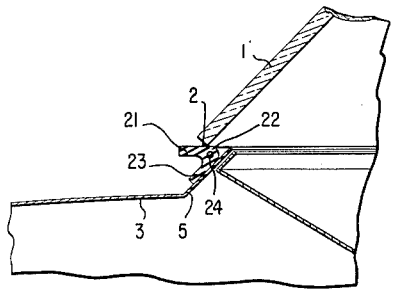

In the embodiment according to FIGURE 2, a profiled ledge member or sectonal strip 21 having a V-shaped cross section is provided in a similar manner which with the apex thereof is pulled into the gap between the lower edge 2 of the windshield pane 1 and the body panel parts 3 by means of a cable or wire 24. The outer body panel parts 3 include an angularly bent portion 5 extending approximately parallelly to the windshield 1 and to the rear thereof against which abuts one of the leg portions 23 of the V-shaped seal 21.

Figure 3:
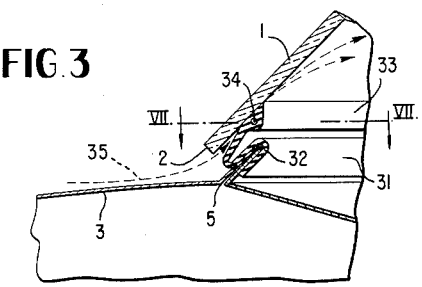

A sealing element 31 adapted to be actuated by an inserted wire or cable 34 is also provided in the embodiment according to FIGURE 3. The seal 31 has an essentially S-shaped cross section so that a groove 32 is formed between two adjoining leg portions by means of which it is placed over an angularly-bent web portion 5 at the body panel parts 3, which, similar to the embodiment of FIGURE 2, is arranged parallelly to the windshield 1 and extends to the rear thereof. The third leg portion 33 of the S-shaped profiled ledge member or sectional strip 31 forms a lip portion which abuts against the inner side of the pane 1 within the area of the rim 2 and is adapted to be lifted off from and/or adapted to be pressed against the same by means of the Bowden cable 34. The sealing ledge member or strip 31 is thereby so constructed that the lip portion 33 thereof in the released condition abuts elastically against the windshield 1 as shown in FIGURES 3 and 7. The Bowden cable 34 extending through the lip portion 33 is secured rigidly at one end at 71 and is secured at the other end at 72 on a lever 73 which is adapted to be swung about the shaft 74. The abutment pressure of the lip portion 33 against the pane 1 which is produced by the inherent elasticity of the seal 31 can be reinforced by swinging the lever 73 in the direction of arrow 75 as shown in FIGURE 7. By swinging the lever 73 in the opposite direction, that is, in the direction of arrow 76 of FIGURE 8, the Bowden cable 34, in contrast thereto, is tensioned and the lip portion 33 is lifted off from the pane 1. The previously closed gap 4 between the pane 1 and the seal 31 is opened as a result thereof and released for the passage of air. Since a relatively high dam-up pressure or pressure head exists in the center of the windshield 1 but an underpressure or vacuum exists within the area of the side edges thereof, the same gap 4 may be simultaneously utilized both for the supply of air to as well as the removal of air from the vehicle interior space. The air stream is indicated in FIGURES 3 and 8 by arrows 35 and 36.

Figure 4:
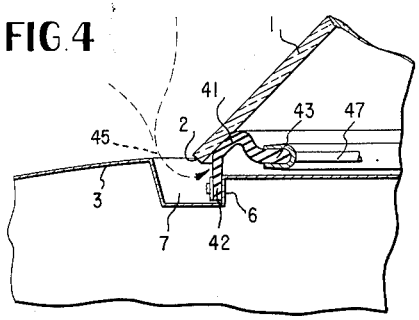

FIGURE 4 also illustrates a seal 41 pressed within the area of the lower edge 2 against the inner side of the windshield 1. The seal 41 of this embodiment is constructed of essentially U-shape in cross section and abuts within the area of the arcuate portion against the transparent pane 1. The one leg portion 42 of the sealing ledge member or strip 41 is secured at a shoulder 6 of the vehicle body panel 3 which is offset in relation to the lower edge 2 of the windshield toward the inside. The free leg portion 43 of the sealing ledge member or strip 41 is angularly bent and surrounded by an actuating member 47 by means of which the seal 41 is adapted to be lifted from the windshield pane 1 and is adapted to be pressed thereagainst. The vehicle body panel 3 forms in this embodiment a channel 7 in combination with the abutment surface 6 and the leg portion 42 of the seal 41 which brings about a deflection of the air stream 45 indicated in dash line by more than 90°. A good separation of the dust and water taken along by the air is achieved thereby and any soiling of the vehicle interior space is effectively avoided thereby.

Figure 5:
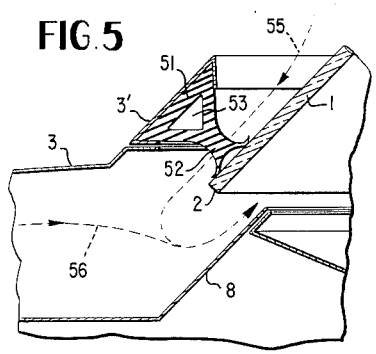

An even more strongly pronounced deflection of the air stream 55 takes place in the embodiment according to FIGURE 5. The vehicle outer body part 3 is drawn up in front of the windshield 1 and extended by a sectional portion 3' in which is retained the sealing ledge member or strip 51 having a dovetail-shaped base body. The seal 51 is constructed as elastic hose and abuts with the lip portion 52 thereof in the area of the lower edge 2 against the outer surface of the transparent pane 1. A pressure medium, for example, pressure oil or compressed air may be admitted into the hollow space 53 of the seal 51 in order to increase the abutment pressure of the seal against the pane 1. By producing a vacuum within the hollow space 53, in contrast thereto, the sealing ledge member 51 is so deformed by the atmospheric pressure that the lip portion 52 thereof is lifted off from the pane 1 and releases a gap between the pane 1 and the seal 51 for the air stream 55. The sheet metal member 8 arranged below the outer body panel 3 enables the admixture to the fresh air 55 of, for example, warm air 56 coming from the engine space so that the arrangement according to FIGURE 5 may simultaneously be utilized for heating the vehicle.

Figure 6:
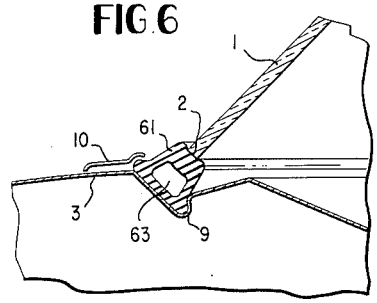

Similarly as in the embodiment according to FIGURE 5, a seal 61 in the form of an elastic hose serves also in the embodiment of FIGURE 6 for sealing the lower edge 2 of the windshield pane 1. The base body of the seal 61 is again constructed in a dovetail-like manner and is retained in a correspondingly constructed channel 9 at the vehicle body part 3 by means of clamps 10. The seal 61 is thereby so constructed that upon admission of a pressure medium into the hollow space 63, the seal 61 comes into abutment against the edge 2 of the pane 1 whereas with the production of a vacuum within the hollow space 63 the seal 61 is lifted off from this edge in the direction of the pane surface. Particularly large abutment pressure may be utilized with this embodiment for sealing the pane because the pane can absorb very large forces in the direction of its surface. The seal 61 could also be so constructed that upon discontinuance of the pressure in the hollow space 63, the seal lifts off by itself from the lower edge 2 of the pane 1.

Referring now to FIGURE 9, which illustrates also a cross section through the forward part of a passenger motor vehicle, provided with a ventilating system according the present invention, reference numeral 101 designates therein the windshield pane which is retained within a frame 103 by means of the seal 102. The frame 103 together with the rear angularly bent part 104 of a forward outer body sheet metal panel 105 is secured at a sheet metal wall 106. Additionally, a sheet metal element 107 which is angularly bent several times and passes over into the dashboard is also secured at the wall 106. The projecting part of the window frame 103 delimits or defines, together with the rear part of the outer body cover panel 105, an air channel or duct 108 which extends by way of apertures 109 within the angularly-bent part 104 of the outer body panel 105 as well as the separating wall 106 up to a point to the rear of the windshield 101. The air channel 108, limited or defined at the bottom thereof and to the rear thereof by the angularly-bent sections of the sheet metal member 107, terminates or discharges within the area of the lower edge of the windshield pane 101.

As shown in FIGURES 10 and 11, this channel 108, that is, the discharge 110 thereof extends over the entire length of the lower edge of the windshield pane 101. By reason of the particular configuration of the sheet metal member 107, the channel 108 extends within the area in front of the discharge 110 approximately prallelly to the windshield pane 101 so that the admitted air the direction of flow of which is indicated by the dash line 119 flows over the windshield pane 101 on the inside thereof. Additionally, a deflection of the air by more than 90° is forceably obtained whereby a good separation of the dust and water particles from the admitted air is assured.

Within the area of the discharge 110 is arranged, at the side of the channel 108 facing the windshield pane 101, a profiled ledge member or sectional strip made of rubber and having a lip portion 111 projecting into the channel 108. The lip portion 111 is adapted, with the aid of a wire or cable system 112, illustrated in detail in FIGURES 10 and 11, to be brought into abutment against the oppositely disposed wall portion 107 of the channel 108 for purposes of closing the same or for purposes of opening the channel 108, is adapted, to be lifted from this wall portion 107. The closure position of the lip portion 111 is indicated in FIGURE 9 in dash lines. In the embodiment illustrated in FIGURE 9, the profile ledge member or sectional strip with the lip portion 111 is made in one piece with the sealing edge member 102 for the windshield pane 101.

As illustrated in greater detail in FIGURES 10 and 11, the wire or cable system 112 is held relatively stationary with the aid of a bored cylindrical part 113 which is rotatably supported between the outer end of the part 107 and an intermediate piece 114. The other end of the cable system 112 extends through a similar cylindrical guide piece 115 and is secured at an adjusting lever 116 which is pivotally supported so as to swing about the shaft 117. As seen from FIGURE 10, by swinging the lever 116 in the direction of arrow 118, the part of the cable 112 disposed between the guide pieces 113 and 115 is lengthened and as a result thereof the sealing lip portion 111 is lifted off from the wall part 107 so that a more or less wide gap 108' is opened up between the wall part 117 and the lip portion 111 for the passage of air as indicated in FIGURE 10 by arrows 119 and 120. Since a pressure head builds up within the area of the center of the windshield pane and an underpressure or vacuum within the area of the lateral edges thereof during the drive, the air stream takes place within this area of the center of the windshield as indicated by arrows 109 that is from the outside toward the inside of the vehicle whereas within the area of the lateral edges the flow of air is from the inside toward the outside as indicated by arrow 120. The same channel 108 can therefore be utilized with a correspondingly wide construction for both supplying fresh air as well as removing stale air from the vehicle interior space. If, in contradistinction thereto, the air channel 108 is to be closed, then the lever 116 is swung, as shown in FIGURE 11, in the direction of arrow 121 whereby the wire or cable system 112 is shortened within the area between the guide pieces 113 and 115, and the lip portion 111 is brought into firm abutment against the side walls 107. The profiled ledge member or sectional strip with the lip portion 111 is appropriately so constructed that the lip portion 111 elastically abuts in the released condition against the wall portion 107 of the channel 108 and thereby closes the same.

Figure 12:
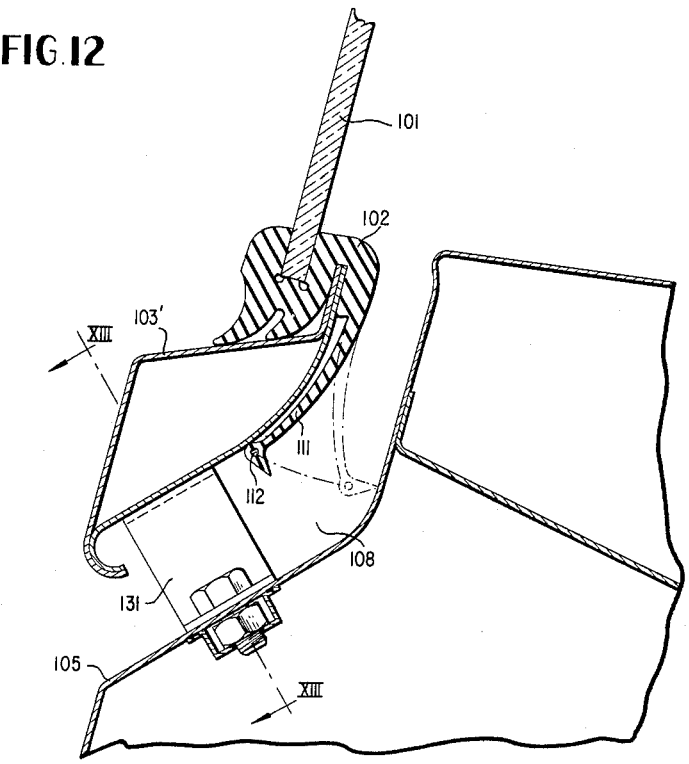
FIGURE 12 is a partial cross sectional view, similar to FIGURE 9, of still a further modified embodiment of a ventilating system in accordance with the present invention.
Figure 13:
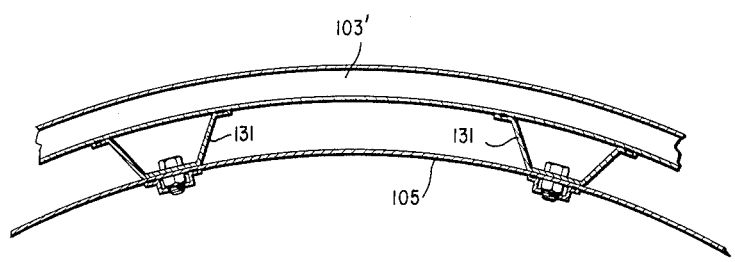
FIGURE 13 is a schematic cross sectional view, on a reduced scale, taken along line XIII—XIII of the installation of FIGURE 12.

The embodiment according to FIGURES 12 and 13 is constructed similar to that of FIGURE 9. The window frame 103' forms in this embodiment a closed hollow body which is supported at the outer vehicle body panel 105 with the aid of spacer brackets 131. The outer body panel 105 extends without interruption into the interior space of the vehicle and forms a wall portion of the air duct or channel 108. In this embodiment, the seal 102 for the windshield pane 101 is again provided with a lip portion 111 for purposes of closing the air channel 108. The lip portion 111 is adapted, with the aid of a wire or a cable system 112, to be lifted from the oppositely disposed walls of the channel 108 for purposes of opening the same or to be brought into abutment against these walls for purposes of closing the channel 108. This construction of the ventilating installation is particularly suitable for trucks or buses with a driver seat in front.

While I have shown and described several embodiments in accordance with the present invention, it is understood that the same is not limited thereto. In particular, installations according to the present invention may also find use with side windows or rear windows of a motor vehicle as well as at any suitable edge portion of such a windowpane. Additionally, such installations may be provided simultaneously at the upper, lower and/or lateral edge portions of the same pane, possibly therefore along the entire circumference of a pane. For purposes of achieving particularly large air gaps, for example, at one edge, the window columns may also be inclined with respect to the plane of the window and may possibly also cross the window pane. Additionally, not only ventilating slots terminating within the area of the rims of clear-vision or transparent windowpanes, but also the discharge apertures of ventilating or heating channels located at any other suitable places within the vehicle may be closed in accordance with the present invention. The present invention may also be used, on the other hand, with apertures which are provided between outer body cover panels of the motor vehicles.

Thus, while I have shown and described several specific embodiments in accordance with the present invention, it is understood that the same is not limited thereto, but is susceptible of many changes and modifications within the spirit and scope thereof, as known to a person skilled in the art, and I therefore do not wish to be limited to the details shown and described herein, but intend to cover all such changes and modifications as are encompassed by the scope of the appended claims.

I claim:
1. An installation for ventilating the interior space of motor vehicles having securely retained windowpanes, in which the air passage takes place within the area of the rim portions of the windowpanes,
   comprising windowpane means, body panel means adjacent said windowpane means, and seal means for sealing the windowpane means with respect to the adjacent body panel means, and means for selectively providing a gap between the free edge of the windowpane means and one of the parts consisting of said seal means and the adjacent body panel means for the passage of air, said seal means comprising a sealing member adapted for movement from a position in which the sealing member engages said windowpane means to a further position in which said sealing member is spaced from said windowpane means, and mechanical actuating means including a movable actuating member secured to and movable with said sealing member for selectively controlling the movement of said sealing member from one to the other of said positions.

2. An installation according to claim 1, wherein said actuating member is inserted into said sealing member for selectively pulling said sealing member from the outside against said gap.

3. An installation according to claim 1, wherein said sealing member comprises elastic profiled ledge means of round cross section and said actuating member is inserted into said profiled ledge means for selectively pulling said profiled ledge means from the outside against said gap.

4. An installation according to claim 1, wherein said sealing member includes
   elastic profiled ledge means of substantially V-shaped cross section,
   said actuating member comprising Bowden cable means inserted into said profiled ledge means for selectively pulling said profiled ledge means with the apex thereof from the outside against said gap.

5. An installation according to claim 1, further including window frame means, wherein,
said seal means is approximately U-shaped in cross section and abuts within the region of the web portion thereof against said windowpane means while one of the leg portions thereof is secured to said window frame means,
said actuating member being operatively connected with the other leg portion of said seal means.

6. An installation according to claim 5, further including means disposed to the rear of said windowpane means for effecting a deflection of the air stream by more than 90°.

7. An installation for ventilating the interior space of motor vehicles having securely retained windowpanes, in which the air passage takes place within the area of the rim portions of the windowpanes,
comprising pane means, body panel means adjacent said windowpane means, and seal means including elastic sealing ledge means secured to said adjacent body panel means for sealing the windowpane means with respect to adjacent body panel means and movably arranged at least over a part of the length thereof,
said sealing ledge means having a lip portion abutting against said window means,
and means for selectively providing a gap between the free edge of the windowpane means and the adjacent body panel means for the passage of air including a Bowden cable inserted into said lip portion for selectively lifting said lip portion from said window means or for pressing said lip portion against said windowpane means from the inside thereof.

8. An installation for ventilating the interior space of motor vehicles having securely retained windowpanes, in which the air passage takes place within the area of the rim portions of the windowpanes,
comprising windowpane means, body panel means adjacent said windowpane means, and seal means for sealing the windowpane means with respect to the adjacent body panel means,
and means for selectively providing a gap between the free edge of the windowpane means and one of the parts consisting of said seal means and the adjacent body panel means for the passage of air, said seal means comprising a sealing member adapted for movement from a position in which said sealing member engages said pane means and thereby closes said gap to a further position in which said sealing member is spaced from said pane means and mechanical actuating means including a movable member secured to and movable with said sealing member for selectively controlling the movements of said sealing member from one to the other of said positions.

9. An installation for ventilating the interior space of motor vehicles having securely retained windowpanes, in which the air passage takes place within the area of the rim portions of the windowpanes,
comprising windowpane means, body panel means adjacent said windowpane means, and seal means including sectional strip means for sealing the windowpane means with respect to adjacent body panel means, said sectional strip means including a sealing member selectively movable to and from a sealing position and a non-sealing position with respect to said windowpane means,
said sectional strip means being provided with groove means and being positioned by said groove means on a web portion formed by said body panel means,
and means for selectively providing a gap between the free edge of the windowpane means and one of the two parts consisting of the movably arranged part of the seal means and adjacent body panel means for the passage of air including mechanical means comprising lever means for selectively moving said sealing member from one to the other of said positions.

10. An installation according to claim 9, wherein said mechanical means further comprises a Bowden wire embedded in said sealing member and operatively connected to said lever means for operation by the latter.

11. An installation for ventilating the interior space of motor vehicles having securely retained windowpanes, in which the air passage takes place within the area of the rim portions of the windowpanes,
comprising windowpane means, body panel means adjacent said windowpane means, and seal means for sealing the windowpane means with respect to the adjacent body panel means, said seal means being adapted for movement to and from a release position and an actuated position, said seal means elastically abutting against said windowpane means in the released position thereof,
and mechanical means including Bowden cable means for controlling said movement of said seal means to and from said positions.

12. An installation for ventilating the interior space of vehicles having windowpane means, air duct means for the passage of air therethrough forming relatively flat and wide channel means,
sectional strip means made of flexible material arranged within the area of the discharge of the channel means along one wide side thereof and including lip means extending into said channel means,
and selectively actuatable mechanical means for selectively moving said lip means into a position wherein said lip means is in abutment against the oppositely disposed walls of the channel means for closing the same, or for moving said lip means into a position wherein said lip means is spaced from said walls for purposes of opening the channel means, said mechanical means comprising a Bowden wire member secured interiorly of said lip means.

References Cited by the Examiner

UNITED STATES PATENTS

| | | | |
|---|---|---|---|
| 1,277,477 | 9/1918 | Ranger | 98—2 |
| 1,440,714 | 1/1923 | Berry | 98—2 |
| 2,019,904 | 11/1935 | Hoffman | 98—2.6 |
| 2,045,578 | 6/1936 | Buford | 98—2 |
| 2,081,486 | 5/1937 | Kraft | 98—2.2 |
| 2,377,794 | 6/1945 | Lobelle | 98—1 |

FOREIGN PATENTS

| | | |
|---|---|---|
| 739,539 | 11/1955 | Great Britain. |
| 552,064 | 11/1956 | Italy. |

MEYER PERLIN, *Primary Examiner.*

PERCY L. PATRICK, *Examiner.*